United States Patent
Kulkarni et al.

(10) Patent No.: US 12,390,785 B2
(45) Date of Patent: Aug. 19, 2025

(54) CONTINUOUS FLOW REACTOR

(71) Applicant: COUNCIL OF SCIENTIFIC AND INDUSTRIAL RESEARCH, New Delhi (IN)

(72) Inventors: Amol Arvind Kulkarni, Pune (IN); Mrityunjay Keshavprasad Sharma, Pune (IN)

(73) Assignee: COUNCIL OF SCIENTIFIC AND INDUSTRIAL RESEARCH, New Delhi (IN)

( * ) Notice: Subject to any disclaimer, the term of this patent is extended or adjusted under 35 U.S.C. 154(b) by 545 days.

(21) Appl. No.: 17/756,638

(22) PCT Filed: Nov. 27, 2020

(86) PCT No.: PCT/IN2020/050984
§ 371 (c)(1),
(2) Date: May 28, 2022

(87) PCT Pub. No.: WO2021/106015
PCT Pub. Date: Jun. 3, 2021

(65) Prior Publication Data
US 2022/0410116 A1   Dec. 29, 2022

(30) Foreign Application Priority Data
Nov. 28, 2019   (IN) .............................. 201911048743

(51) Int. Cl.
*B01J 19/24*   (2006.01)
*B01F 23/50*   (2022.01)
(Continued)

(52) U.S. Cl.
CPC ........... *B01J 19/2405* (2013.01); *B01F 23/56* (2022.01); *B01F 25/4233* (2022.01);
(Continued)

(58) Field of Classification Search
CPC .... B01J 4/001; B01J 19/2405; B01J 19/2415; B01J 2219/00085; B01F 23/56; B01F 25/4233; B01F 35/92; B01F 2215/0431
See application file for complete search history.

(56) References Cited

U.S. PATENT DOCUMENTS 3,853,986 A    12/1974 Blass et al.
4,313,680 A *  2/1982 Honnen ............ B01F 25/31331
                                            366/337
(Continued)

FOREIGN PATENT DOCUMENTS

CN    109985572 A  *  7/2019
GB       994789 A  *  6/1965   .............. B01J 19/18
(Continued)

OTHER PUBLICATIONS

International Search Report and Written Opinion, mailed Mar. 1, 2021, from PCT/IN2020/050984 filed Nov. 27, 2020.

*Primary Examiner* — Audrey B. Walter
(74) *Attorney, Agent, or Firm* — Workman Nydegger (57) ABSTRACT

A continuous flow reactor without any moving parts to facilitate solid-liquid reaction without clogging is disclosed herein. It comprises plurality of identical cavities in series/sequence, each cavity being provided with: a pair of inlets at the top to allow entry of reactants into the reactor; an outlet at the bottom to allow the reactants to the next cavity for mixing; and a jacket covering around the cavities to provide heating or cooling effect as per the requirement. The outlet of the previous cavity is inclined at a suitable angle relative to the outlet of the next cavity to prevent clogging and facilitate efficient mixing of the reactants.

8 Claims, 6 Drawing Sheets

(51) Int. Cl.
  *B01F 25/42*  (2022.01)
  *B01F 25/421*  (2022.01)
  *B01F 35/92*  (2022.01)
  *B01J 4/00*  (2006.01)

(52) U.S. Cl.
  CPC .............. *B01F 35/92* (2022.01); *B01J 4/001* (2013.01); *B01J 19/2415* (2013.01); *B01F 2215/0431* (2013.01); *B01J 2219/00085* (2013.01)

(56) References Cited

U.S. PATENT DOCUMENTS

| | | | |
|---|---|---|---|
| 5,397,179 A * | 3/1995 | Berlin .................. | B01F 25/433 366/337 |
| 5,596,067 A | 1/1997 | Komiya et al. | |
| 8,759,278 B2 * | 6/2014 | Corominas ............ | B01F 23/41 510/522 |
| 8,828,337 B2 | 9/2014 | Kensy et al. | |
| 2010/0065512 A1 | 3/2010 | Bjorsvik | |
| 2014/0255265 A1 | 9/2014 | Kulkarni et al. | |

FOREIGN PATENT DOCUMENTS

| | | |
|---|---|---|
| WO | 2013050764 A1 | 4/2013 |
| WO | 2017106916 A1 | 6/2017 |

\* cited by examiner

CONTINUOUS FLOW REACTOR

FIELD OF THE INVENTION

The present invention relates to a continuous flow reactor without any moving parts that can handle liquid-solid suspension. Particularly, the present invention relates to a reactor for solid flow operations viz. for reactions involving solids as reactants, products or by products or as a catalyst. More particularly, the present invention relates to the jacketed solid flow reactor for heat transfer with unique geometry for reactions where solids are involved either as reactants, as a catalyst generated during the reaction as a product, by product, intermediate or for solid processing operations.

BACKGROUND OF THE INVENTION

Advent of flow reactors has revolutionized the ways of carrying out process chemistry research in the last two decades. A large number of important reactions which otherwise could not have been carried out in an effective manner can now be easily carried out in flow reactors by virtue of their improved mixing, heat transfer and mass transfer characteristics. Many flow reactors are being widely used, and their scaled-up versions are available in a variety of materials viz. metals, polymers, ceramic, and glass. The metallic flow reactors not only offer high heat transfer area per unit volume, small mixing lengths, high mass transfer rates (depending upon the channel geometry), but also give a very strong and robust option for process development from the laboratory scale to the commercial scales. There is ample literature available on continuous flow reactors.

Reference may be made to a patent application US20140255265A1, wherein it discloses continuous flow reactor composed of varied permutations and combinations of a plurality of modular/fluidic components for chemical processing. The components are connected to each other using connectors that facilitate the connection of either with two or more, similar or different components.

Reference may be made to a patent application WO2017106916A1, wherein it discloses a static mixer element configured as a module for a continuous flow chemical reactor chamber, wherein the static mixer element comprises a catalytically active scaffold defining a plurality of passages configured for mixing one or more fluidic reactants during flow and reaction thereof through the mixer, and wherein at least a portion of a surface of the scaffold comprises a catalytic material for providing the surface with catalytically reactive sites.

Reference may be made to a patent application US20100065512A1, wherein it discloses a reactor which comprises at least one chamber, and where the chamber is fitted with a number of inlets and a number of outlets for supply of reactants and outflow of products, respectively, and where an oscillator is arranged in the longitudinal direction of the chamber, so that an annular reaction room is created for conversion of chemical reactants, between the outer surface of the oscillator and the internal surface of the chamber, and where a number of discs with perforations are arranged mutually spaced apart on the oscillator, and where the oscillator is in connection to a motor that forces, in relation to the at least one chamber, a pulsating forward and backward movement of the oscillator.

However, while available flow reactors are robust, they are not useful for carrying out large number of important reactions where solids are involved either as reactant, product, by product or any intermediates generated during the reaction which limits the extent to which these flow reactors are being utilized. The problems of handling solids in flow may be overcome by use of reactor presented in the proposed invention.

Reference may be made to a Granted U.S. Pat. No. 8,828,337 attempts to address several problems associated with the existing microreactors, including clogging of the reactor. US'337 addresses these problems by proposing different geometries for cavities. The cavities employed in the said microreactor may be one or more. In case of plurality of cavities, all the cavities are identical. One of the approach at a variation for the base area of the cavities proceeds from one extreme of a square base area and, by increasing the number of corners, approaches the other extreme of a round base area. It is therefore proposed in US'337 that the cross-section should comprise more than four corners. The construction-relevant length of the base side of a polygon can also be calculated, with a given area of 112.16 mm2, by the construction of a triangle between a base side and two adjacent radii of the polygon. It is therefore alternatively proposed in US'337 that the cross-section should comprise less than four corners. In the second approach at a variation, again proceeding from a square, the transition to the circular base area was achieved by the construction of circles with increasing radius in the corners of the square. The magnitudes of the radius of the corner circle, as well as the remaining straight line of the initial square, are of relevance for the construction. It is advantageous if the cavity diverges from the shape of a polygon. The mixing in US'337 is achieved by shaking of the device. Further the cavities do not have any inlet and outlet ports.

Reference may be made to a patent application WO2013050764A1, wherein it discloses flow reactor that is modular, scalable and reconfigurable. The reactor comprises of any number of standard sections that, once assembled together, combine into a continuous flow chemical reactor system of a desired length. A section comprises a number of conduits, the diameters of which could vary, that once assembled together form a reactor vessel. In addition, a section comprises additional conduits for allowing flow of heating or cooling fluid.

Reference may be made to a patent application WO2017106916A1, wherein it discloses a static mixer element configured as a module for a continuous flow chemical reactor chamber, wherein the static mixer element comprises a catalytically active scaffold defining a plurality of passages configured for mixing one or more fluidic reactants during flow and reaction thereof through the mixer, and wherein at least a portion of a surface of the scaffold comprises a catalytic material for providing the surface with catalytically reactive sites.

Reference may be made to a patent application US20100065512A1, wherein itdiscloses a reactor which comprises at least one chamber, and where the chamber is fitted with a number of inlets and a number of outlets for the supply of reactants and outflow of products, respectively, and where an oscillator is arranged in the longitudinal direction of the chamber, so that an annular reaction room is created for conversion of chemical reactants, between the outer surface of the oscillator and the internal surface of the chamber, and where a number of discs with perforations are arranged mutually spaced apart on the oscillator, and where the oscillator is in connection to a motor that forces, in relation to the at least one chamber, a pulsating forward and backward movement of the oscillator.

There are reactors available for handling solids during the reactions in flow but their usability is restricted to limited concentrations of solids, nature of solids and they involve moving parts which needs to be reassembled and need external source of energy (ultrasound, vibration etc.) during processing/reaction to have solids remain suspended. Though these reactors solve the problem of solids to some extent, problems remain since they can process solids of very low concentration only inside the system, flow of sticky solids are very difficult as the flow in these reactors are in the upward direction, these reactors involve moving parts which makes them vulnerable for wear and tear which require good maintenance. The problem of handling solids in continuous flow persisted for quite some time since many reactions in pharma, specialty chemicals, fine chemical involve solids reactants (which are mostly not soluble in the solvent or not soluble in solvents/reaction media at desired concentration) which brings out the need for the reactor which can offer the advantage of flow technology with the ability to handle the solids for the wide range of concentrations and for the variety of solid types. To overcome the drawbacks of available reactors in the art, the present invention discloses a novel reactor for handling the solids in flow for wide range of solid concentrations and solid types in reaction media, which does not have any moving parts and possess the advantages of the flow technology.

Objective of the Invention

The primary object of the present invention is to provide a continuous flow reactor for handling solid liquid reaction in a continuous flow operation/reaction.

Another object of the present invention is to provide a continuous flow reactor and a solid flow reactor without any moving parts, which can be operated at wide range of solid concentration and for a wide variety of solid types at varied temperature range and pressure.

Yet another object of the present invention is to provide a continuous flow reactor, and a solid flow reactor thereof, with unique geometry and with the cavities of the reactor inclined at a suitable angle relative to the next cavity such that it prevents clogging and facilitates efficient mixing of the reactants.

Another object of the present invention is to provide a continuous flow reactor, and a solid flow reactor thereof, which can be used for reactions which involve solids as reactants, reagents, products, by products or involve any intermediate which gets generated in the reaction or as catalyst or for solid processing operations like crystallization, dissolution, precipitation, extraction etc. which involve solid solutions/suspension without any reactions. To accomplish the objectives, the present invention provide a novel reactor without any moving parts with a unique geometry and angle for handling solids in continuous flow operations/reactions with good mixing, high throughput, better heat exchange and good temperature control.

SUMMARY OF THE INVENTION

Figure 1:
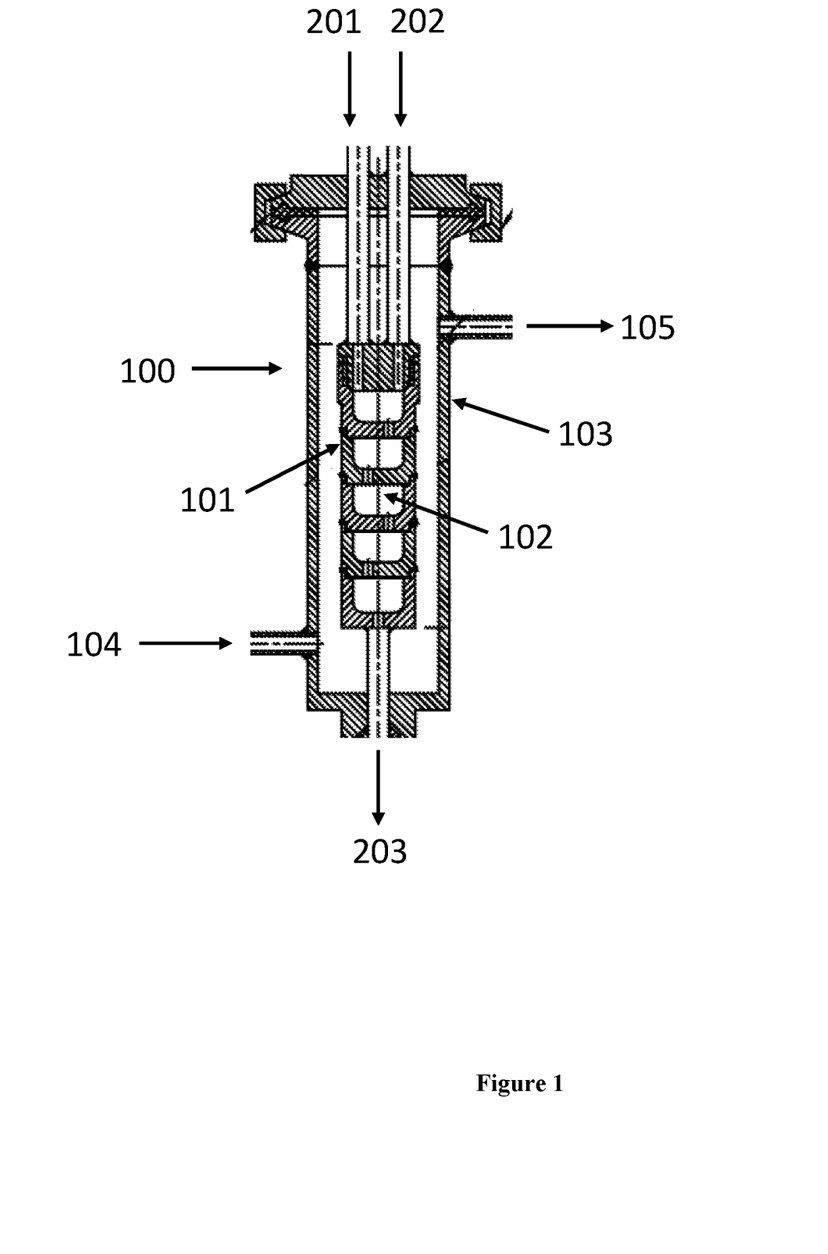
FIG. 1 depicts the solid flow reactor assembly (100), which includes the continuous flow reactor (101) having individual cavities (102) are assembled in series, and are covered with jacket (103) in the shell with at least a pair of inlets (201, 202) and at least one outlet (203).

Accordingly, the present invention relates to a solid continuous flow reactor assembly [100, FIG. 1] to facilitate solid-liquid suspension without clogging comprising of:
a. a flow reactor [101, FIG. 1];
b. a pair of inlets [201, 202, FIG. 1] at the top side of the reactor [101];
c. an outlet [203, FIG. 1] at a bottom side of the reactor [101];
d. identical cavities [102, FIG. 1] arranged in series/sequence inside the reactor[101];
e. a jacket [103, FIG. 1] covering inside of the assembly [100].

In an embodiment of the present invention, the numbers of cavities [102] arranged are at least two and maximum of 20.

In another embodiment of the present invention, the first cavity has two inlets and one outlet which open into the next cavity.

In yet another embodiment of the present invention, the angle between inlet and outlet port of the each cavity is in the range of 30°-180°.

In yet another embodiment of the present invention, the distance of outlet of each cavity from central axis of the flow reactor [101] is in the range of 0.4-0.8 of the radius.

In yet another embodiment of the present invention, the bottom surface of each of the cavities [103] is selected from hemisphere, flat circular or an asymmetric conical.

In yet another embodiment of the present invention, the jacket [103] having an inlet [104, FIG. 1] close to the outlet [203] and an outlet [105, FIG. 1] close to the pair of inlets [201, 202].

In yet another embodiment of the present invention, the flow reactor [101] is operated at variable flow rates with solid concentration of 10%-30% to have the different operational throughput.

In yet another embodiment of the present invention, the flow reactor [101] is adapted to withstand pressure ranging from atmospheric pressure to 100 bar and temperature ranging from −20° C. to 180° C.

DETAILED DESCRIPTION OF THE INVENTION

Accordingly, the present invention discloses a continuous flow reactor without any moving parts to facilitate solid-liquid reaction without clogging. The continuous flow reactor comprises plurality of identical cavities in series/sequence. Each cavity is provided with a pair of inlets at the top to allow entry of reactants into the reactor; an outlet at the bottom to allow the reactants to the next cavity for mixing; and a jacket covering around the cavities to provide heating or cooling effect as per the requirement. Particularly, the continuous flow reactor of the present invention has a provision such that the outlet of the previous cavity is inclined at a suitable angle relative to the outlet of the next cavity that prevents clogging and facilitates efficient mixing of the reactants.

In an embodiment, the continuous flow reactor comprises of number of uniquely designed identical cavities which are connected in series, wherein the numbers of cavities can be varied to suit the required reactor volume.

In the preferred embodiment, the angle between the outlets of the previous cavity and the next cavity is around 30°-180° to facilitate efficient mixing of solid particles and liquid.

The individual cavities are covered in jacket to have the heat transfer area for heating or cooling the reactor for reactions/solid flow operations. In alternate embodiment, entire continuous flow reactor is covered with the jacket.

Another embodiment of the present invention provides a continuous flow reactor, wherein said reactor is adapted to withstand pressure ranging from atmospheric pressure to 100 bar and temperature ranging from −20° C. to 180° C.

Yet another embodiment of the present invention provides a continuous flow reactor where individual cavities are arranged such that to provide different angular flow path to the solution/reaction medium in operation from inlet to the outlet of the reactor. The inlet and outlet of the cavities may be coaxial or otherwise.

In another embodiment of the present invention, the continuous flow reactor is operated at different flow rates with wide range of solid concentration of 10%-30% to have the different operational throughput.

In another embodiment, the continuous flow reactor geometry is designed with the different internal diameter and outlet diameter of the cavities.

In yet another embodiment, the continuous flow reactor is connected in-line with the previous reaction/operation step where reaction mixture/output from previous step is used as input/reactant in the continuous flow reactor.

In yet another embodiment, the continuous flow reactor is connected in-line with the next reaction/operation step where reaction mixture/output from solid flow reactor is used as input/reactant for the next step.

In yet another embodiment of the present invention, the direction of the outlet of the cavities and the shape of the bottom of the cavities of the continuous flow reactor is variable to suit the requirement.

The continuous flow reactor is built-in a reactor assembly or is assembled into a reactor assembly.

In yet another embodiment, the present invention further provides a solid flow reactor assembly that includes the continuous flow reactor without any moving part to facilitate solid-liquid reaction without clogging. The solid flow reactor comprises plurality of identical cavities in series/sequence. Each cavity is provided with a pair of inlets at the top to allow entry of reactants into the reactor; an outlet at the bottom to allow the reactants to the next cavity for mixing; and a jacket covering around the cavities to provide heating or cooling effect as per the requirement. Particularly, the solid flow reactor of the present invention has a provision such that the outlet of the previous cavity is inclined at a suitable angle relative to the outlet of the next cavity that prevents clogging and facilitates efficient mixing of the reactants. In the said embodiment, the angle between the outlets of the previous cavity and the next cavity is around 30°-180°.

In order to overcome the drawbacks of the existing reactors in the art, the present invention disclose the continuous flow reactor for handling solid-liquid reaction in continuous flow operations/reactions without any moving parts. The presented continuous flow reactor and solid flow reactor assembly thereof allows user to carry out reaction which involve solids, which are not soluble in the reaction medium, or soluble in reaction medium but not soluble at desired concentration, easily settling solids, solids which gets generated during the reaction, reaction where reactant, product, by-product or any intermediate which is solid and not soluble in reaction medium at reaction conditions or partially soluble or reaction where solid is a catalyst) in continuous flow at wide range of throughput with wide variation in the solid concentrations at variety of parameters. Also, present invention discloses continuous flow reactor and the solid flow reactor thereof which does not have any moving parts which in terms requires very low maintenance, current art do not offer all these advantages.

The present invention discloses the novel continuous flow reactor and solid flow reactor assembly thereof, which retains the benefits of continuous flow technology with high throughput and solid handling capacity in flow. This reactor may be assembled in line with the existing processes or alternately may be used as standalone unit to carry out the reaction or for solid processing operations. The present invention provides the unique advantage in terms of internal structure which allows the flow of solids at very high throughput and concentration without any blockage and further provides efficient mixing for reactions. The continuous flow reactor without any moving parts eliminates most of disadvantages of the current state of art where solid handling capacities are very low.

The most preferred embodiment may be comprehended by referring to figures appended at the end of the specifications. Referring to FIGS. 1-6, the present invention provides continuous flow reactor (101) without any moving parts to facilitate solid-liquid reaction without clogging. The continuous flow reactor (101) comprises plurality of identical cavities (102) in series/sequence, each cavity (102) being provided with a pair of inlets (201, 202) at the top to allow entry of reactants into the reactor (101); an outlet (203) at the bottom to allow the reactants to the next cavity for mixing; and a jacket (103) covering around the cavities (102) to provide heating or cooling effect as per the requirement. The outlet (203) of the previous cavity (102) is inclined at a suitable angle relative to the outlet (203) of the next cavity (102) to prevent clogging and efficient mixing of the reactants.

In a preferred embodiment, the angle is selected between the outlets of the previous cavity and the next cavity is in the range 30°-180°. In the same embodiment, wherein the jacket (103) is provided with an inlet (104) close to the outlet (203) and an outlet (105) close to the inlet (201, 202) to facilitate heat exchange in the reactor (101). The continuous flow reactor (101) is operated at variable flow rates with solid concentration of 10%-30% to have the different operational throughput, and is adapted to withstand atmospheric pressure and temperature ranging from −20° C. to 180° C.

The present invention further provides a solid flow reactor assembly (100) that includes the continuous flow reactor (101).

As illustrated in FIG. 1 depicts the solid flow reactor assembly (100) comprising identical cavities (102) with unique geometry, assembled in series/sequence to provide the mixing and easy flow of solids inside the reactor. The reactor of the present invention does not contain any moving parts. The assembly is covered inside the jacket (103) to provide the cooling or heating in case of exothermic or endothermic reaction. The reactor is provided with at least a pair of inlets [201, 202] at a top side of the reactor. However, the number of inlets may vary based on the process requirement. The reactor is further provided with at least one outlet at a bottom side of the assembly.

The reactor according to the present invention is connected at the inlet of the next step or at the outlet of the previous step in the continuous multistep operation. The inlet and the outlet of each of the cavity may be coaxial or otherwise.

Accordingly, in one embodiment, the continuous flow reactor can be connected in-line with the next reaction/operation step where reaction mixture/output from solid flow reactor is used as input/reactant for the next step.

In an alternate embodiment, the continuous flow reactor can be connected in-line with the previous reaction/operation step where reaction mixture/output from previous step is used as input/reactant in the solid flow reactor.

In an embodiment, the invention provides the continuous flow reactor having unique geometry with number of identical cavities, assembled in series to have desired reactor volume.

Figure 2:
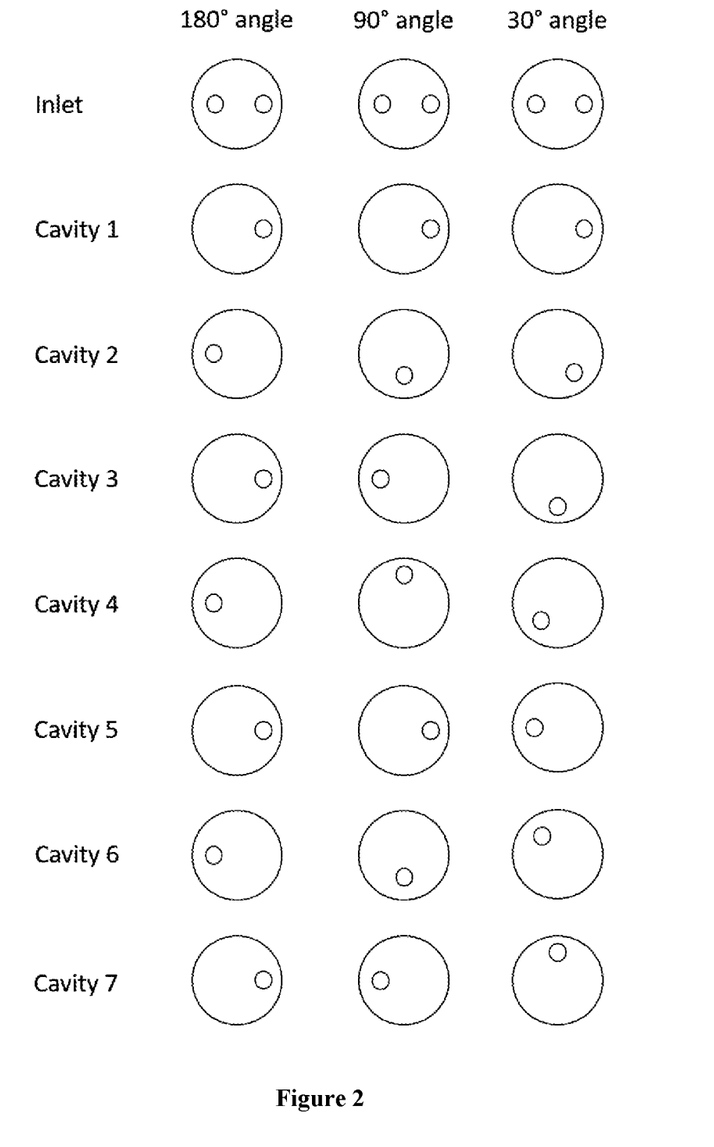
FIG. 2 depicts the cavities (102) are assembled such that the outlet (203) of each cavity (102) is at making an angle (30°, 90°, 180°) from the previous outlet and to the next outlet.

In yet another embodiment, the present invention provides a continuous flow reactor where individual cavities are arranged so as to provide different angular flow path to the solution/reaction medium in operation from inlet to the outlet of the reactor. This aspect of the invention is illustrated in FIG. 2 wherein, the cavities are arranged such that the outlet of each cavity is at a particular angle from the previous outlet and to the next outlet. FIG. 2 demonstrates three of such angles 30°, 90° & 180°.

Figure 6:
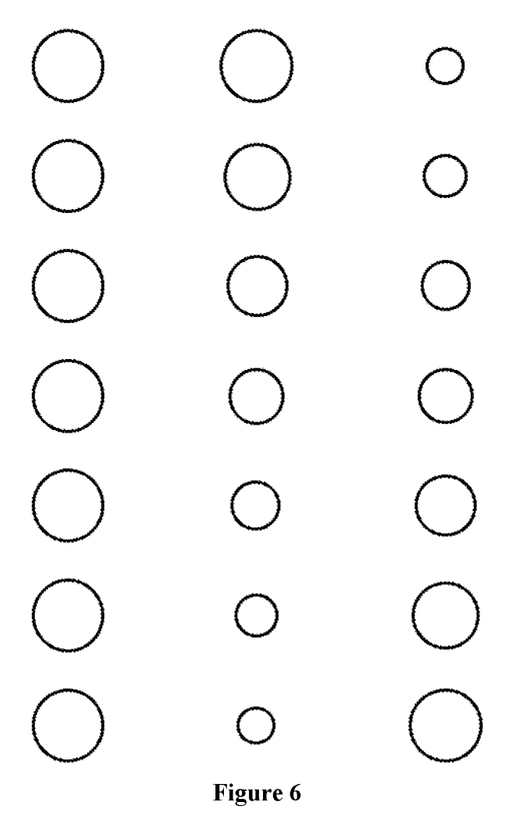
FIG. 6 depicts the arrangement of cavities (102) with varying outlet diameter.

In another embodiment, the continuous flow reactor geometry may have different internal diameter and outlet diameter of the cavities. The internal diameter of the cavity and the outlet diameter of the cavity (102) may be varied to suit the process requirement. Further, the cavities in the solid reactor may be arranged with varying outlet diameter, as depicted in FIG. 6.

In yet another embodiment, the direction of the outlet of the cavities and the shape of the bottom of the cavities (102) in the flow reactor may be changed to suit the process requirements.

Figure 3:
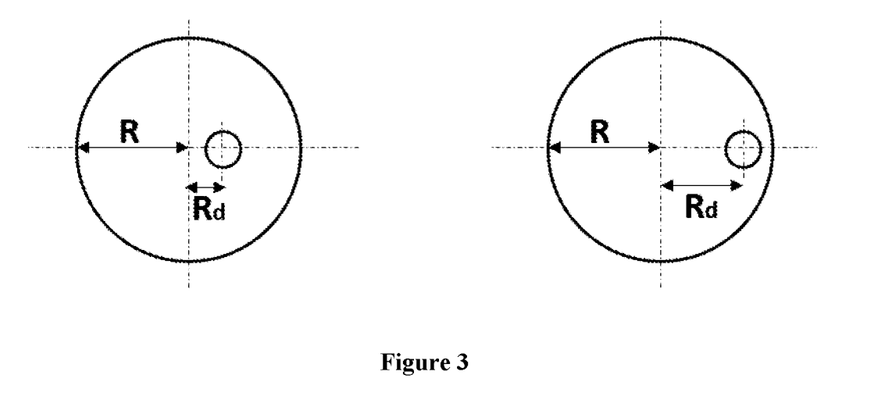
FIG. 3 depicts the distance of outlet (203) of individual cavity (102) from the central axis of the reactor which can remain same throughout the arrangement or is varied (Rd=0.4R to 0.8R).

The distance of cavity outlet in each cavity from the central axis may be varied along the assembly of the cavities, as illustrated in FIG. 3. The distance of outlet of individual cavity from the central axis of the reactor may be varied in the range of 0.4-0.8 of the radius. In an embodiment, the distance of outlet of individual cavity from the central axis of the reactor may remain constant.

Figure 4:
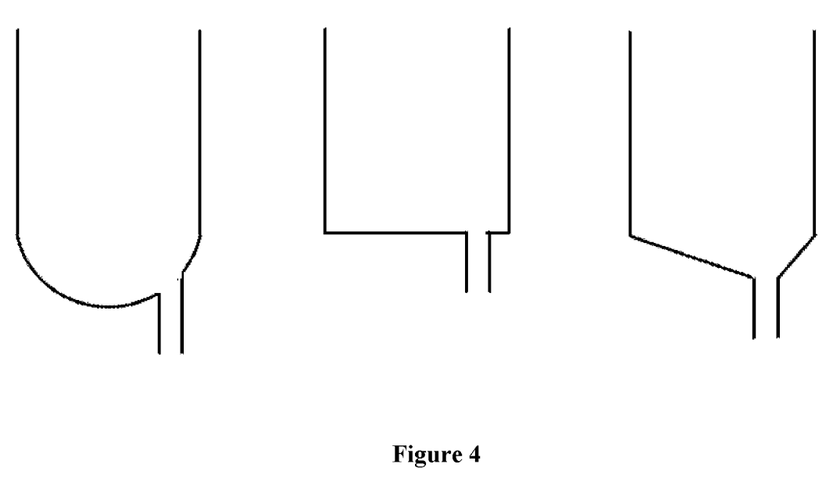
FIG. 4 depicts the bottom side of the individual cavities (102), which may be of any shape to have easy flow of solids inside the reactor.
Figure 5:
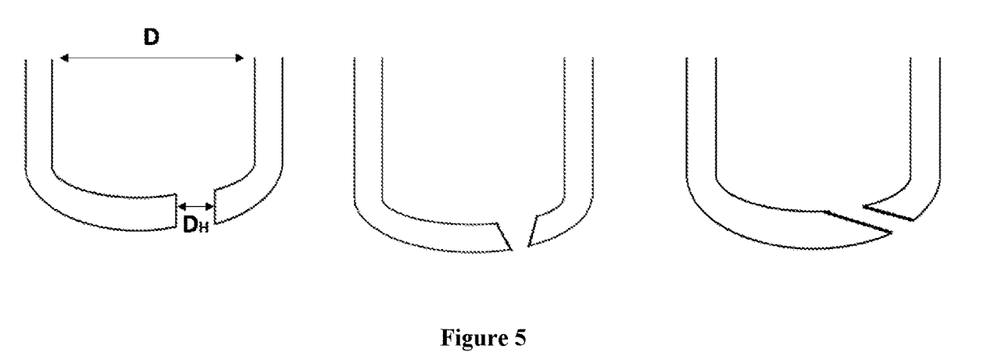
FIG. 5 depicts the shape of the outlet in the individual cavities (DH=0.02D to 0.1D).

The shape of the bottom of each cavity may be of any shape as illustrated in the FIG. 4 or of any random shape as illustrated in FIG. 5 for smooth flow of solids. In an embodiment, the shape may be selected from hemisphere, flat circular or an asymmetric conical shape and such.

In another embodiment of the present invention provides a continuous flow reactor, wherein said reactor can withstand the temperature ranging from −20° C. to 180° C. and the pressure ranging from atmospheric pressure to 100 bar.

In another embodiment of the present invention, continuous flow reactor may be operated at different flow rates with wide range of solid concentration ranging from 10%-30% to have different operational throughput.

The solid flow reactor according to the present invention can be used for continuous flow operations like crystallization, dissolution, precipitation, extraction etc. which involve solid solutions/suspension without any reactions.

The solid flow reactor as described in the invention allows user to carry out reaction which involve solids in continuous flow at wide range of throughput with wide variation in the solid concentrations at variety of parameters.

The solid flow reactor according to the invention may be constructed using variety of materials e.g. metal, hard polymers, ceramic and alloys, etc. that can withstand high temperature reactions and pressure ranges According to an embodiment, the solid flow reactor can be used as stand-alone unit to carry out the reaction or for solid processing operations and further requires very low maintenance cost as it does not have any moving parts.

Other features and embodiments of the invention will become apparent by. Various changes and modifications to the disclosed embodiments will be apparent to those skilled in the art.

EXAMPLES

The following examples which are given for illustration of the invention rather than limiting its intended scope Example 1

Experiments were carried out by pumping slurry of Glass particles of 250 μm diameter having density of 2500 kg/m3 in a straight tube (2 mm inner diameter) of 1 m length. The mass fraction of solids was 25% (w/w) and the flow rate of the slurry was kept at 20 ml/min. The tube was found to get clogged after 150 s.

Example 2

Experiments were carried out by pumping slurry of Glass particles of 250 μm diameter having density of 2500 kg/m$^3$ in a straight tube (2 mm inner diameter) of 1 m length. The mass fraction of solids was 25% (w/w) and the flow rate of the slurry was kept at 125 ml/min. The flow rates were very high and the connections to the tube inlet simply got disconnected due to sudden rise in the pressure drop.

Example 3

Experiments were carried out by pumping slurry of Glass particles of 250 μm diameter having density of 2500 kg/m$^3$ in the flow reactor with 8 cavities given in this invention. The first cavity has two inlets and one outlet. The outlet opens in the next cavity. The angle between the inlet and outlet ports with reference to the line centre line was 180° in all the cavities. Each cavity has a diameter of 10 mm, height of 15 mm and the inlet/outlet port sizes were 2 mm. The mass fraction of solids was 25% (w/w) and the flow rate of the slurry was kept at 125 ml/min. The reactor did not clog even after pumping the slurry through it for 4 hours.

Example 4

For the experimental set-up given in Example 3, experiments were carried out at identical conditions in a reactor where the angle between the inlet and outlet ports with reference to the line centre line was 90° in all the cavities. The reactor did not clog even after pumping the slurry through it for 4 hours.

Example 5

For the experimental set-up given in Example 4, experiments were carried out by pumping slurry of magnesium hydroxide particles of 150 μm diameter having density of 2340 kg/m3. The mass fraction of solids was 25% (w/w) and the flow rate of the slurry was kept at 70 ml/min. The reactor did not clog even after pumping the slurry through it for 4 hours.

Example 6

Experiments were carried out by pumping slurry of activated carbon particles of 10 μm diameter having density of 2100 kg/m3 in the flow reactor with 8 cavities given in this invention. The first cavity has two inlets and one outlet. The outlet opens in the next cavity. The angle between the inlet and outlet ports with reference to the line centre line was 180° in all the cavities. Each cavity has a diameter of 10 mm, height of 15 mm and the inlet/outlet port sizes were 2 mm. The mass fraction of solids was 15% (w/w) and the flow rate of the slurry was kept at 75 ml/min. The reactor did not clog even after pumping the slurry through it for 4 hours.

Example 7

Experiments were carried out by pumping slurry of starch particles of 1.1 mm diameter having density of 820 kg/m3 in the flow reactor in Example 6. The mass fraction of solids was 8% (w/w) and the flow rate of the slurry was kept at 75 ml/min. The reactor did not clog even after pumping the slurry through it for 4 hours.

Example 7

Experiments were carried out by pumping slurry of crushed starch particles of 500 μm diameter having density of 820 kg/m3 in the flow reactor in Example 6. The mass fraction of solids was 10% (w/w) and the flow rate of the slurry was kept at 75 ml/min. Silicone tube (2.5 mm i.d.) connecting the reactor with pump was seen to get clogged after 6 minutes.

Example 8

Experiments were carried out by pumping slurry of crushed starch particles of 500 μm diameter having density of 820 kg/m3 in the flow reactor in Example 6. Silicone tube (4 mm i.d.) connecting the reactor with pump worked without clogging for 1 hour.

Example 9

Experiments were carried out by pumping slurry of crushed starch particles of 500 μm diameter having density of 820 kg/m3 in the reactor in Example 6. The mass fraction of solids was 10% (w/w) and the flow rate of the slurry was kept at 75 ml/min. Upon using silicone tube (4 mm i.d.) connecting the reactor with pump the reactor did not clog until the silicone tube got clogged after 1 hour.

Example 10

Experiments were carried out by precipitating α-naphthol from aqueous NaOH solution in the flow reactor in Example 6. 20.4 g α-naphthol was dissolved in 2.5% (wt./vol.) NaOH solution (Solution A). This prepared solution was used for the all the experiments. 65 ml of 35% HCl was dissolved in 500 ml water (Solution B) and this solution was used for neutralization of above prepared α-naphthol solution. Solution A was pumped from one inlet at a flow rate of 23 ml/min and Solution B from another inlet at a flow rate of 26 ml/min. The reactor was operated for 1 hour. Residence time in the reactor was 28 s. Sample was collected over filter paper for 180 s. This led to formation of 7 gm of solid particles.

Example 11

For the conditions in Example 10, experiments were carried out in the flow reactor in Example 6 where Solution A was pumped from one inlet at a flow rate of 85 ml/min and Solution B from another inlet at a flow rate of 88 ml/min. The reactor was operated for 1 hour without any clogging. Residence time in the reactor was 8 s. Sample was collected over filter paper for 30 s. This led to formation of 5 gm of solid particles.

Example 12

Experiments were carried out by precipitating α-naphthol from aqueous NaOH solution in the flow reactor in Example 6. 40 g α-naphthol was dissolved in 5% (wt./vol.) NaOH solution. This prepared solution was used for the all the experiments. 65 ml of 35% HCl was dissolved in 500 ml water (Solution B) and this solution was used for neutralization of above prepared α-naphthol solution. Solution A was pumped from one inlet at a flow rate of 85 ml/min and Solution B from another inlet at a flow rate of 88 ml/min. The reactor was operated for 1 hour. Residence time in the reactor was 8 s. Sample was collected over filter paper for 30 s. This led to formation of 17 gm of solid particles.

Example 13

Experiments were carried out by precipitating α-naphthol from aqueous NaOH solution in the flow reactor in Example 6. 80 g α-naphthol was dissolved in 5% (wt./vol.) NaOH solution (Solution A). This prepared solution was used for the all the experiments. 65 ml of 35% HCl was dissolved in 500 ml water (Solution B) and this solution was used for neutralization of above prepared α-naphthol solution. Solution A was pumped from one inlet at a flow rate of 85 ml/min and Solution B from another inlet at a flow rate of 88 ml/min. The reactor was operated for 1 hour. Residence time in the reactor was 8 s. Sample was collected over filter paper for 30 s. This led to formation of 17 gm of solid particles.

Advantages

The typical reactors for handling solids contain moving parts or any external source of energy to make solids suspended in solution and work with very low throughput and solid loading capacities. The present invention does not have any moving parts and can be used for high throughput and high solid loading capacity.

The reactor of the present invention can be used at high temperature and variety of solid suspension. The volume of the reactor can be varied easily just by varying the number of cavities.

The invention claimed is:
1. A solid continuous flow reactor assembly to facilitate a solid-liquid suspension without clogging, comprising of:
   a. a flow reactor;
   b. a pair of inlets at a top side of the flow reactor;
   c. an outlet at a bottom side of the flow reactor;
   d. identical cavities arranged in series/sequence inside the flow reactor, wherein a first cavity included in the identical cavities is coupled with the pair of inlets at the top side of the flow reactor, and wherein the first cavity includes an outlet that opens into a second cavity included in the identical cavities, wherein the pair of inlets at the top side of the flow reactor are configured with the first cavity to allow entry of reactants into the flow reactor; and e. a jacket covering the identical cavities is configured to provide a heating or cooling effect.

2. The solid continuous flow reactor assembly as claimed in claim 1, wherein an angle between an inlet and an outlet in each of the identical cavities is in a range of 30°-180°.

3. The solid continuous flow reactor assembly as claimed in claim 1, wherein a bottom surface of each of the identical cavities is selected from hemisphere, flat circular or an asymmetric conical.

4. The solid continuous flow reactor assembly as claimed in claim 1, wherein the jacket has an inlet close to the outlet at the bottom side of the flow reactor, and wherein the jacket has an outlet close to the pair of inlets at the top side of the flow reactor.

5. The solid continuous flow reactor assembly as claimed in claim 1, wherein the flow reactor is configured to operate at variable flow rates with solid concentration of 10%-30%.

6. The solid continuous flow reactor assembly as claimed in claim 1, wherein the flow reactor is adapted to withstand pressure ranging from atmospheric pressure to 100 bar and temperature ranging from −20° C. to 180° C.

7. The solid continuous flow reactor assembly as claimed in claim 1, wherein numbers of the identical cavities arranged are at least two and maximum of 20.

8. The solid continuous flow reactor assembly as claimed in claim 7, wherein the identical cavities each have a radius, wherein a distance of an outlet of each identical cavities from a central axis of the flow reactor is in a range of 0.4-0.8 the radius of the identical cavities.

* * * * *